United States Patent [19]

Fujioka et al.

[11] Patent Number: 4,950,464
[45] Date of Patent: Aug. 21, 1990

[54] PURIFICATION OF SULFURYL FLUROIDE BY SELECTIVE ADSORPTION

[75] Inventors: George S. Fujioka, Walnut Creek; Brian G. Tobey, Pleasant Hill; David D. Friese, Antioch, all of Calif.

[73] Assignee: The Dow Chemical Company, Midland, Mich.

[21] Appl. No.: 309,459

[22] Filed: Feb. 10, 1989

[51] Int. Cl.$^5$ ............................................. L01B 17/45
[52] U.S. Cl. .................................................... 423/468
[58] Field of Search ................... 423/468; 55/73, 74, 55/71, 30, 35; 210/660, 689, 690

[56] References Cited

U.S. PATENT DOCUMENTS

| | | | |
|---|---|---|---|
| 3,092,458 | 6/1963 | Ruh et al. | 423/468 |
| 3,714,336 | 1/1973 | Davis et al. | 423/468 |
| 3,789,580 | 2/1974 | Allemana et al. | 55/71 |
| 3,996,029 | 12/1976 | Gustafson et al. | 55/71 |
| 4,087,377 | 5/1978 | Fujioka et al. | 423/468 |
| 4,092,403 | 3/1978 | Rectenwald et al. | 423/488 |
| 4,738,694 | 4/1988 | Godino et al. | 55/74 |

FOREIGN PATENT DOCUMENTS

| | | | |
|---|---|---|---|
| 546963 | 10/1957 | Canada | 423/468 |
| 3626853 | 2/1988 | Fed. Rep. of Germany | 55/74 |
| 0004477 | 1/1977 | Japan | 55/74 |
| 982755 | 12/1982 | U.S.S.R. | 55/74 |
| 872932 | 7/1961 | United Kingdom | 210/690 |
| 1089864 | 11/1967 | United Kingdom | 423/468 |

OTHER PUBLICATIONS

T. Terei et al., *AIChE Journal*, 19, 387–389 (1973).
C. Jorgensen et al., *Environmental Progress*, 6, 26–31 (1987).
H. Michele, *International Chemical Engineering*, 27, 183–196 (1987).
O. A. Hougen et al., *Chemical Engineering Progress*, 43, 197–208 (1947).

*Primary Examiner*—Jeffrey E. Russel
*Assistant Examiner*—Brian M. Bolam
*Attorney, Agent, or Firm*—D. Wendell Osborne

[57] ABSTRACT

Many impurities of sulfuryl fluroide are removed by selective adsorption on activated alumina and activated carbon. Thionyl fluoride, hydrogen fluoride, hydrogen chloride, and water are removed by treating contaminated sulfuryl fluoride with activated alumina. Sulfur dioxide and 1,2-dichloroethane are removed by treating contaminated sulfuryl fluoride with activated carbon. When sulfuryl fluoride is treated with the two adsorbents in sequence, sulfuryl fluoride of exceptionally high purity is obtained.

30 Claims, No Drawings

PURIFICATION OF SULFURYL FLUROIDE BY SELECTIVE ADSORPTION

BACKGROUND OF THE INVENTION

The present invention relates to a method of purifying sulfuryl fluoride by treating contaminated sulfuryl fluoride with activated alumina and/or activated carbon.

Sulfuryl fluoride is employed as a space fumigant, particularly for the control of termites. As a result of this utility sulfuryl fluoride comes in contact with the valuable contents of homes, museums, and commercial buildings and it is, therefore, critical that it not be harmful to a wide variety of materials. Many of the typical low level impurities of sulfuryl fluoride, however, are capable of tarnishing metals, etching glass, and degrading fabrics. Among the deleterious impurities often found in small amounts in impure sulfuryl fluoride are hydrogen fluoride, hydrogen chloride, thionyl fluoride, sulfur dioxide, and chlorinated hydrocarbons. The only known methods of removing these deleterious impurities is by distillation or by extraction with water, both of which have serious deficiencies in terms of the completeness of the removal or of introducing new problems associated with water. The discovery of new methods of removing small amounts of impurities such as hydrogen fluoride, hydrogen chloride, thionyl fluoride, sulfur dioxide, and chlorinated hydrocarbons from sulfuryl fluoride is, accordingly, highly desirable.

SUMMARY OF THE INVENTION

It has now been found that many of the known impurities of sulfuryl fluoride can be removed by selectively adsorbing the impurities in the contaminated sulfuryl fluoride on adsorbents including either or both of activated alumina and activated carbon. Thionyl fluoride, acidic compounds, water, and certain other impurities can be removed in the process when activated alumina is employed and sulfur dioxide, hydrogen fluoride, chlorinated hydrocarbons and certain other impurities can be removed when activated carbon is employed. The adsorbents can be employed sequentially to achieve the production of sulfuryl fluoride of exceptionally high purity.

The process of the invention is a process for purifying contaminated sulfuryl fluoride which comprises contacting the contaminated sulfuryl fluoride with at least one adsorbent selected from activated alumina and activated carbon, under conditions suitable for the selective adsorption of at least one contaminant, and, thereafter, recovering the purified sulfuryl fluoride.

Activated alumina is generally preferred when the impurities to be removed are thionyl fluoride, hydrogen fluoride, hydrogen chloride, and/or water. Activated carbon is generally preferred when the impurities to be removed are sulfur dioxide and/or chlorinated hydrocarbons. It is further often preferred to sequentially contact the impure sulfuryl fluoride with both activated alumina and activated carbon to obtain a highly purified product.

The process is preferably carried out continuously with the sulfuryl fluoride in either the vapor state or the liquid state.

DETAILED DESCRIPTION OF THE INVENTION

The adsorption process of the present invention is generally employed to remove small amounts of impurities from sulfuryl fluoride. Sulfuryl fluoride containing a total of up to about 10 percent of contaminating impurities is suitable for the process and sulfuryl fluoride containing a total of up to about 2 percent of contaminating impurities is usually employed Sulfuryl fluoride containing less than about 1 percent of any one impurity is also usually employed. The impure sulfuryl fluoride suitable for the process is usually nominally dry, but may contain trace amounts of water. Other impurities that are often present and which can be removed by the process of the present invention include hydrogen fluoride, hydrogen chloride, thionyl fluoride, sulfur dioxide, sulfuryl fluorochloride, and chlorinated hydrocarbons, such as 1,2-dichloroethane. The process is carried out in such a way that the concentration of at least one of these impurities in the purified product of the process is greatly reduced. It is generally desirable to reduce these impurities to as low a level as possible, which is usually non-detectable up to about 0.01 percent. The amount of an impurity remaining in the purified product actually obtained depends partly on the operating conditions and procedures employed and these can be adjusted by applying known principles and the teachings herein.

The process of the present invention appears to work because activated alumina and activated carbon have a low affinity for sulfuryl fluoride as compared with its impurities. Very little, if any, loss of sulfuryl fluoride is suffered in the process using either activated alumina or activated carbon. The sulfuryl fluoride purified by the present method is especially valuable for use as a space fumigant because of its lack of impurities that otherwise cause problems, such as etching glass, staining metals, and deteriorating fabrics.

When the contaminated sulfuryl fluoride contains more than about 2 percent total impurities, it is usually advantageous to remove as much of the contamination as is practical by distillation or by other conventional methods before utilizing the present process.

Sulfuryl fluoride is available commercially and several methods are known for its preparation. It is, for example, readily prepared by the reaction of sulfur dioxide, chlorine, and hydrogen fluoride. All of the known methods produce sulfuryl fluoride contaminated with at least small amounts of starting materials, intermediates, or by-products.

Activated alumina can be defined as a highly porous, granular form of aluminum oxide having a large surface area and a large adsorptive capacity. All known types of activated alumina can be employed as the adsorbent in the present process. It is often preferred to use an activated alumina containing little or no silica since there is a possibility that the silica could react with thionyl fluoride or hydrogen fluoride to produce water and the volatile silicon tetrafluoride and introduce this new contaminant into the product. Activated aluminas of many descriptions are available commercially and their preparation is well documented in the art. LaRoche (formerly Kaiser) A-201 activated alumina is an example of a suitable adsorbent. This activated alumina is described as generally spherical with a high surface area (280–360 $m^2/g$), high static absorption (19–22 percent), high abrasion resistance (0.1–0.5 percent loss), a bulk density (packed) of 46-50 lbs/ft$^3$, and a porosity of about 0.50-0.55 cm$^3$/g. It typically assays about 94 percent alumina, about 0.02 percent silica, about 0.02 percent ferric oxide, and about 0.35 percent sodium oxide and has about 6 percent loss on ignition.

Activated carbon can be defined as an amorphous form of carbon characterized by high adsorptivity for many gases, vapors, and colloidal solids. It has a very large internal surface area in the order of 10,000 ft$^2$/g. Activated carbons are made by the destructive distillation of wood, nut shells, animal bones, and other carbonaceous materials and can be activated by heating to 800°-900° C. with steam or carbon dioxide. All activated carbons are believed to be useful in the present invention. One type of activated carbon of particular interest is PCB type coconut shell carbon, which is available from Calgon Corp. (formerly Pittsburgh Activated Carbon) and other companies. This type of activated carbon has a hardness of at least about 92, a maximum ash of about 6 percent, an iodine number of at least about 1200, and a minimum carbon tetrachloride absorption of about 60 weight percent.

The activated alumina and activated carbon employed in the process of the invention can be in any desired and available physical form, such as granular, spherical, pelletized, or powdered. The form selected depends on factors such as the specific equipment and process conditions employed, availability, and cost.

Essentially any of the many types of reactors known to be useful for adsorption process can be employed for the present process. These reactors are discussed in essentially all textbooks on unit processes and in many specific publications, such as *Chemical Engineering Progress*, 43, 197-208. The only absolute requirements are that the reactor possess means of introducing contaminated sulfuryl fluoride and fresh activated alumina or activated carbon and of removing purified sulfuryl fluoride and spent activated alumina or activated carbon and that it be constructed of materials reasonably resistant to these reagents. A means of controlling the temperature in the reactor is sometimes helpful, especially in the case of activated carbon where a thermal regeneration of the adsorbent is often advantageous. Reactors designed for processes involving the contact of a solid adsorbent with either gaseous or liquid materials are suitable. It is often preferred to employ a reactor designed for the contact of solid materials with gaseous materials, ie., vapor phase reactors. It is also often preferred to employ a reactor designed for the contact of solid materials with liquid materials: i.e., liquid phase reactors. Reactors designed for either batch or continuous operation can be employed. It is usually preferred to employ reactors designed for continuous operation. Reactors composed essentially of one or more upright adsorption columns, which may be connected in series and/or in parallel, are often preferred. The fluid flow in such columns may be either upward or downward.

When activated alumina is employed as the adsorbent, thionyl fluoride, acid compounds, such as hydrogen chloride and hydrogen fluoride, water, and certain other impurities can be removed from sulfuryl fluoride. These impurities are selectively adsorbed on activated alumina as compared to sulfuryl fluoride. Thionyl fluoride, which is a particularly difficult impurity to remove from sulfuryl fluoride, usually appears to be the least selectively adsorbed of the named impurities, but the process is especially useful in removing this material. Acidic compounds, such as hydrogen fluoride and hydrogen chloride, and water are known, for example from U.S. Pat. No. 4,092,403 and *AIChE Journal*, 19, 387-389, to be readily adsorbed activated alumina. Thus, when the present process is employed using conditions suitable for the removal of thionyl fluoride from sulfuryl fluoride, the removal of acidic compound contaminants and water is achieved as a side benefit. This greatly increases the value of the invention since thionyl fluoride, acid compound contaminants, and water can all be removed in one operation.

The removal of thionyl fluoride by adsorption on activated alumina according to the present invention results in the formation of sulfur dioxide as a by-product and this compound remains in the treated product as an impurity. Sulfuryl dioxide is a far less deleterious contaminant in sulfuryl fluoride than is thionyl fluoride. The sulfur dioxide formed can be removed or, for many applications can be allowed to remain in the sulfuryl fluoride product. The sulfur dioxide can be removed by conventional methods such as fractional distillation and water extraction. It can also be removed by contacting the contaminated sulfuryl fluoride with activated carbon according to the present invention as described below.

The fluoride portion of the thionyl fluoride and the hydrogen fluoride adsorbed onto activated alumina in the process of the present invention appears to become covalently bonded to aluminum. The spent alumina is not readily regenerated.

The removal of thionyl fluoride and, therefore, acid compounds and water from sulfuryl fluoride with activated alumina adsorption takes place under a wide variety of conditions, all of which are by definition conditions suitable for the removal of impurities. The temperature does not appear to be critical and suitable temperatures range from about 0° C. to about 400° C. It is often preferred to operate at temperatures of from about 0° C. to about 100° C. It is usually most preferred to operate at the ambient temperature, which is about 10° C. to about 40° C. The pressure is not critical, and any practical pressure can be employed. It is typically preferred to employ pressures of from about 20 to about 800 psig and more preferred to employ pressures of from about 100 to about 260 psig.

Generally, about 2 parts by weight to about 20 parts by weight of activated alumina is required for each part by weight of thionyl fluoride removed. The fraction of thionyl fluoride removed, however, depends on a variety of operational variables which are well known in the art, and discussed, for example, in *Chemical Engineering Progress*, 43, pages 197-208. Thus, the efficiency of the thionyl fluoride removal depends on the exact composition and structure of the activated alumina employed, the physical form of the activated alumina employed, the efficiency of the contact between the sulfuryl fluoride and the activated alumina, the size of the mass transfer zone, and the like. These variables can be adjusted to obtain the desired purity by range finding experiments carried out essentially as in the examples presented herein and by the application of known adsorption process chemical and engineering principles. In continuous reactors the thickness of the adsorbent bed and the flow rate of the sulfuryl fluoride are important, readily adjusted variables that determine the minimum mass transfer zone necessary. In general, in a continuous vapor phase, fixed bed, upright, tubular reactor having a bed thickness of about 4.4 feet and a mass flow rate about 31 lbs/ft$^2$/min is capable of reducing the thionyl fluoride concentration from about 0.5 percent to less than 0.004 percent (the detection limit of the analytical method employed) when LaRoche (formerly Kaiser) A-201 activated alumina as a 5×8 mesh pellet is employed. Faster mass flow rates can be employed when a thicker bed is employed or if it is not desired to remove the thionyl fluoride so completely.

When activated carbon is employed as the adsorbent, sulfur dioxide, chlorinated hydrocarbons, and certain other impurities, including hydrogen fluoride and sulfuryl fluorochloride, can be removed from sulfuryl fluoride. These compounds are selectively adsorbed on activated carbon as compared to sulfuryl fluoride. Sulfur dioxide appears to be the least selectively adsorbed of the named impurities, but the process is especially useful in removing this material. Thus, when the present process is employed using conditions suitable for the removal of sulfur dioxide from sulfuryl fluoride, the removal of chlorinated hydrocarbons, such as 1,2-dichloroethane and 1,2-di-chloropropane, is achieved as a side benefit. This greatly increases the value of the invention since sulfur dioxide, chlorinated hydrocarbons, and other impurities can all be removed in one operation.

The removal of sulfur dioxide and, therefore, chlorinated hydrocarbons from sulfuryl fluoride with activated carbon adsorption takes place under a wide variety of conditions, all of which are by definition conditions suitable for the removal of impurities. Suitable temperatures range from about 0° C. to about 150° C. It is often preferred to operate at temperatures of from about 0° C. to about 80° C. It is usually more preferred to operate at the ambient temperature, which is about 10° C. to about 40° C. The adsorption is slightly exothermic. The pressure is not critical, and any practical pressure can be employed. It is typically preferred to employ pressures of from about 20 to about 800 psig and more preferred to employ pressures of from about 100 to about 260 psig.

Generally, about 2 parts by weight to about 20 parts by weight of activated carbon are required for each part by weight of sulfur dioxide removed. The fraction of sulfur dioxide removed, however, depends on a variety of operational variables which are well known in the art, and discussed, for example, in *Chemical Engineering Progress*, 43, pages 197–208. Thus, the efficiency of the sulfur dioxide removal depends on the source of the activated carbon employed, the physical form of the activated carbon employed, the efficiency of the contact between the sulfuryl fluoride and the activated carbon, the size of the mass transfer zone, and the like. These variables can be adjusted to obtain the desired purity by range finding experiments carried out essentially as in the examples presented herein and by the application of known adsorption process chemical and engineering principles. In continuous reactors the thickness of the adsorbent bed and the flow rate of the sulfuryl fluoride are important, readily adjusted, variables that determine the minimum mass transfer zone necessary. Faster mass flow rates can be employed when a thicker bed is employed or if it is not desired to remove the sulfur dioxide so completely.

Spent activated carbon from the present process can be regenerated by heating the spent activated carbon at about 150° C. to about 500° C. and purging with an inert gas. It is preferred to regenerate at about 200° C. to about 350° C. and to purge with dry nitrogen. The regeneration can be done in the adsorption reactor or in a separate reactor of the known types suitable for such processes.

Since activated carbon and activated alumina generally remove different impurities from contaminated sulfuryl fluoride, it is often desirable to employ both adsorbents to obtain a highly purified product. This is usually accomplished by sequential treatments, such as by passing the vapors of impure sulfuryl fluoride over first one adsorbent then the other in a vapor phase reactor. It is most advantageous to first contact the impure sulfuryl fluoride with activated alumina and then with activated carbon so that the latter treatment will remove the sulfur dioxide produced as a by-product in the former.

The following examples are presented to illustrate the invention and should not be construed as limiting the invention.

EXAMPLE 1

Removal of Thionyl Fluoride, Hydrogen Chloride, and Hydrogen Fluoride from Sulfuryl Fluoride with Activated Alumina An upright column constructed from a 1.0 in. by 4.0 ft. Hastalloy C pipe and fitted with a gas inlet system at the top having a rotometer and valve and a gas outlet system at the bottom having a sample port, valve and caustic scrubber was packed with 7×12 mesh LaRoche (formerly Kaiser) A-201 activated alumina. Sulfuryl fluoride containing about 5000 ppm (0.5 percent) of thionyl fluoride and about 1000 ppm (0.1 percent) of hydrogen fluoride was passed through the column at about 25° C. initial temperature and 20–25 psig pressure at the rate of 0.03 lbs per hour (mass velocity of 0.08 lbs/ft$^2$/min—about 30 sec retention time) for 7 hours. The effluent vapor stream was sampled at intervals and at the conclusion of the run at the sample port by means of a gas bag. The final sample was analyzed by quantitative gas-liquid chromatography for thionyl fluoride by a method having a detection limit of 40 ppm and none was detected. Sulfur dioxide, however, was found to be present and to have been formed in the process. The sample was further analyzed by quantitative infrared spectroscopy for hydrogen fluoride using the absorption at about 4075 wave numbers and hydrogen chloride using the absorption at about 2822 wave numbers. Neither was detected.

EXAMPLE 2

Removal of Thionyl Fluoride from Sulfuryl Fluoride with Activated Alumina in a Miniplant Continuous Vapor Phase Reactor Two 2.0 in. by 4.4 ft. upright columns with flange connections constructed from schedule 80 carbon steel and connected in series, the first fitted at the top with a gas inlet system having a flowmeter, temperature and pressure gauges, and valve and the second fitted with a gas outlet system at the top having a sample port, a valved opening to a caustic scrubber, a valve, a pressure gauge, a filter, and a chilled collection tank was set up. The columns were connected by a line extending from the bottom of the first column to the bottom of the second column having a temperature gauge and a sample port. Samples were withdrawn by means of a gas bomb. The columns were each packed with about 4.29 lbs of 5×8 mesh LaRoche (formerly Kaiser) A-201 activated alumina by opening the flanges. Sulfuryl fluoride containing about 4500 ppm (0.45 percent) of thionyl fluoride, about 380 ppm (0.038 percent) of hydrogen fluoride and 44 ppm (0.0044 percent) of hydrogen chloride was passed through the column. The temperature at the inlet varied from about 15° C. to about 33° C. and was dependent on the ambient temperature. The pressure at the inlet varied from about 163 to about 175 psig and the pressure at the outlet varied from about 152 to about 164 psig. The sulfuryl fluoride was introduced into the column at the rate of about 30 lbs per hour (mass velocity of 31 lbs/ft$^2$/min). Gas samples were taken at the two sampling ports at various time intervals by means of a gas bomb and were analyzed by quantitative gas-liquid chromatography for thionyl fluoride in a system having a detection limit of 40 ppm. No thionyl fluoride was detected in the purified sulfuryl fluoride product until 8 hours had elapsed and about 240 lbs of sulfuryl fluoride had been treated (about 28 lbs of sulfuryl fluoride treated per lb of activated alumina). Thionyl fluoride began appearing in the effluent of the first column at about 4 hours. After about 30 hours, the thionyl fluoride in the treated sulfuryl fluoride was nearly the same as that of the untreated indicating that the activated alumina was saturated. It was estimated that in all about 0.2 lb of thionyl fluoride was adsorbed per lb of activated alumina. Sulfur dioxide was not present in detectable amounts in the untreated sulfuryl fluoride, but appeared in the product in the first sample taken (2 hours).

EXAMPLE 3

Removal of Sulfur Dioxide and 1,2-Dichloroethane from Sulfuryl Fluoride with Activated Carbon An upright, jacketed carbon-bed adsorber having a 1.5 ft long adsorbent bed designed for up to 200 psig pressure, which was constructed from a 3 ft. long 0.5 in. diameter schedule 40 nickel pipe for the adsorbent surrounded by a 1.5 in. schedule 40 steel pipe for the jacket. This was equipped with an inlet system near the bottom, having a sample port, a flowmeter, and a valve, with an outlet system near the top having a hook-up to an on-line gas-liquid chromatograph, a filter, a valve, and a caustic scrubber, and with a thermocouple extending from the top into the adsorbent bed. The adsorbent was held in place in the center of the nickel pipe with nickel screen plugs. The jacket had an inlet and an outlet connected to a heated air system for temperature control. The adsorbent bed was loaded with 45.7 g of 8–10 mesh PCB type coconut shell carbon from Pittsburg Activated Carbon and the system was flushed with nitrogen for about 1 hour. Contaminated sulfuryl fluoride vapors containing about 0.2 percent sulfur dioxide, about 0.2 percent thionyl fluoride, and about 0.35 percent 1,2-dichloroethane were passed through the adsorber at about 20° C. (ambient) and about 200 psig at the average rate of about 0.83 g mole/hour, taking care that no liquid drops entered the adsorption zone. The temperature in the carbon bed rose about 3° C. above ambient during the run. Analyses of the effluent gases by quantitative gas-liquid chromatography using two on-line chromatographs, one equipped with a thermal conductivity detector and the other with a flame ionization detector was done at various time intervals. Sulfur dioxide was not detected in the effluent sulfuryl fluoride for the first 56 hours of operation. A low level of 1,2-dichloroethane was detected in all effluent sulfuryl fluoride samples during the run, but it was always greatly reduced. Thionyl fluoride was not detected in the effluent sulfuryl fluoride at any time in this run.

The activated carbon from a selective adsorption experiment essentially the same as the above was regenerated by heating the column to about 180° C. by means of hot air in the jacket and passing dry nitrogen through the adsorption column at from bottom to top. The effluent was monitored for sulfur dioxide and 1,2-dichloroethane as above at various time intervals. Only trace amount of sulfur dioxide and 1,2-dichloroethane were detected in the effluent after about 32 hours. The regenerated activated carbon was used for selective absorption as in the above experiment and found to have a minimum of 84 percent as much adsorptive capacity.

We claim:

1. A process for purifying contaminated sulfuryl fluoride which comprises contacting the contaminated sulfuryl fluoride with at least one adsorbent selected from activated alumina and activated carbon, at a temperature of from about 0° C. to about 100° C. under conditions suitable for the selective adsorption of at least one impurity selected from hydrogen fluoride, hydrogen chloride, sulfur dioxide, and thionyl fluoride, and, thereafter, recovering the purified sulfuryl fluoride.

2. A process according to claim 1 wherein the sulfuryl fluoride is in the vapor state.

3. A process according to claim 1 wherein the sulfuryl fluoride is in the liquid state.

4. A process according to claim 1 wherein the process is carried out in a continuous manner.

5. A process according to claim 1 wherein the purified sulfuryl fluoride is used as a space fumigant.

6. A process for purifying contaminated sulfuryl fluoride which comprises contacting the contaminated sulfuryl fluoride with both activated alumina and activated carbon absorbents, under conditions suitable for the selective adsorption of at least one impurity, and, thereafter, recovering the purified sulfuryl fluoride.

7. A process according to claim 6 wherein the contaminated sulfuryl fluoride is contacted first with activated alumina and then with activated carbon.

8. A process according to claim 7 wherein each step of the process is carried out in a continuous manner.

9. A process for purifying contaminated sulfuryl fluoride which comprises contacting the contaminated sulfuryl fluoride with an activated alumina adsorbent, under conditions suitable for the selective adsorption of at least one impurity, and, thereafter, recovering the purified sulfuryl fluoride.

10. A process according to claim 9 wherein the sulfuryl fluoride is in the vapor state.

11. A process according to claim 9 wherein the sulfury fluoride is in the liquid state.

12. A process according to claim 9 wherein the process is carried out in a continuous manner.

13. A process according to claim 9 wherein the process is carried out at a temperature of about 0° C. to about 100° C.

14. A process according to claim 9 wherein the process is carried out at a pressure of about 20 psig about 800 psig.

15. A process according to claim 9 wherein the activated alumina employed is LaRoche A-210 activated alumina.

16. A process according to claim 9 wherein thionyl fluoride is present in the contaminated sulfuryl fluoride and is a contaminant selectively adsorbed in the process.

17. A process according to claim 16 wherein the sulfuryl fluoride after purification by the process contains less than 0.01 percent of thionyl fluoride.

18. A process according to claim 9 wherein acidic compounds and/or water and thionyl fluoride are present in the contaminated sulfuryl fluoride and are contaminants selectively adsorbed in the process.

19. A process according to claim 18 wherein the acidic compounds include at least one of hydrogen fluoride and hydrogen chloride.

20. A process according to claim 1 wherein the adsorbent is activated carbon.

21. A process according to claim 20 wherein the sulfuryl fluoride is in the vapor state.

22. A process according to claim 20 wherein the sulfuryl fluoride is in the liquid state.

23. A process according to claim 20 wherein the process is carried out in a continuous manner.

24. A process according to claim 20 wherein the process is carried out at a temperature of about 0° C. to about 80° C.

25. A process according to claim 20 wherein the process is carried out at a pressure of about 20 psig to about 800 psig.

26. A process according to claim 20 wherein the activated carbon is PCB coconut shell activated carbon.

27. A process according to claim 20 wherein sulfur dioxide is present in the contaminated sulfuryl fluoride and is a contaminant selectively adsorbed in the process.

28. A process according to claim 20 wherein the activated carbon employed is additionally regenerated after use by purging with inert gas at a temperature of about 150° C. to about 500° C.

29. A process according to claim 1 wherein the adsorbent is activated alumina.

30. A process according to claim 29 wherein the sulfuryl fluoride is in the vapor state and the process is carried out continuously at a temperature of about 0° C. to about 100° C. and a pressure of about 20 psig to about 800 psig.

* * * * *